US008166282B2

(12) United States Patent
Madriles et al.

(10) Patent No.: US 8,166,282 B2
(45) Date of Patent: Apr. 24, 2012

(54) MULTI-VERSION REGISTER FILE FOR MULTITHREADING PROCESSORS WITH LIVE-IN PRECOMPUTATION

(75) Inventors: Carlos Madriles, Barcelona (ES); Peter Rundberg, Goteborg (SE); Jesus Sanchez, Barcelona (ES); Carlos Garcia, Barcelona (ES); Pedro Marcuello, Barcelona (ES); Antonio Gonzalez, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/896,585

(22) Filed: Jul. 21, 2004

(65) Prior Publication Data

US 2006/0020775 A1    Jan. 26, 2006

(51) Int. Cl.
*G06F 9/00* (2006.01)
(52) U.S. Cl. ........................... 712/220; 712/205
(58) Field of Classification Search .................. 712/235
See application file for complete search history.

(56) References Cited

U.S. PATENT DOCUMENTS

| | | | |
|---|---|---|---|
| 6,182,210 B1* | 1/2001 | Akkary et al. | 712/235 |
| 6,330,661 B1* | 12/2001 | Torii | 712/228 |
| 6,389,446 B1* | 5/2002 | Torii | 718/100 |
| 6,574,725 B1* | 6/2003 | Kranich et al. | 712/31 |
| 2002/0144083 A1* | 10/2002 | Wang et al. | 712/23 |
| 2003/0126365 A1* | 7/2003 | Jamil et al. | 711/120 |
| 2004/0006683 A1* | 1/2004 | Brekelbaum et al. | 712/217 |
| 2004/0133767 A1* | 7/2004 | Chaudhry et al. | 712/225 |
| 2004/0148491 A1* | 7/2004 | Damron | 712/34 |
| 2005/0138334 A1* | 6/2005 | Sodani et al. | 712/218 |

OTHER PUBLICATIONS

Jinfeng Liu, Research Project Report "Adaptive Partitioning Schemes in Multi-threading Processors", Aug. 6, 2000, pp. 1-24, 36-37.*
Jenn-Yuan Tsai; Jian Huang; Amlo, C.; Lilja, D.J.; Pen-Chung Yew; "The superthreaded processor architecture" Computers, IEEE Transactions on vol. 48, Issue 9, Sep. 1999 pp. 881-902.*
Jeffery A. Brown, Hong Wang, George Chrysos, Perry H. Wang, John P. Shen "Speculative Precomputation on Chip Multiprocessors", at the 6th Workshop on Multithreaded Execution, Architecture, and Compilation (MTEAC-6), Nov. 2002.*
Pedro Marcuello, Antonio Tonzález, Jordi Tubella, "Speculative multithreaded processors", Jul. 1998, Proceedings of the 12th international conference on Supercomputing, Publisher: ACM Press.*
Steve S.W. Liao, Perry H. Wang, Hong Wang, Gerolf Hoflehner, Daniel Lavery, John P. Shen, "Post-pass binary adaptation for software-based speculative precomputation", May 2002, ACM SIGPLAN Notices, Proceedings of the ACM SIGPLAN 2002 Conference on Programming language design and implementation PLDI '02, vol. 37 Issue 5 Publisher: ACM Press.*

(Continued)

*Primary Examiner* — Idriss N Alrobaye
(74) *Attorney, Agent, or Firm* — Blakely, Sokoloff, Taylor & Zafman LLP (57) ABSTRACT

Disclosed are selected embodiments of a processor that may include a plurality of thread units and a register file architecture to support speculative multithreading. For at least one embodiment, live-in values for a speculative thread are computed via execution of a precomputation slice and are stored in a validation buffer for later validation. A global register file holds the committed architecture state generated by a non-speculative thread. Each thread unit includes a local register file. A directory indicates, for each architectural register, which speculative thread(s) have generated a value for the architectural register. Other embodiments are also described and claimed.

7 Claims, 10 Drawing Sheets

OTHER PUBLICATIONS

Tor Aamodt, Pedro Marcuello, Paul Chow, Per Hammarlund, and Hong Wang, Prescient Instruction Prefetch, MTEAC-6, (in conjunction with MICRO-35), pp. 3-10, Istanbul Turkey, Nov. 2002.*

Pedro Marcuello, "Speculative Multithreaded Processors", thesis, Jul. 2003.*

Venkata Krishnan, "A Chip-Multiprocessor Architecture with Speculative Multithreading", IEEE, Sep. 1999.*

A Dynamic Multithreading Processor—AKKARY Microcomputer Research Labs (Intel) and Driscoll Department of Electrical and Computer Engineering Portland State University—No Date.

Hardware and Software Support for Speculative Execution of Sequential Binaries on a Chip-Multiprocessor—Krisiiman and Torrellas (U of IL) Department of Computer Science—1998.

The Expandable Split Window Paradigm for Exploiting Fine-Grain Parallelism—Franklin and Sohi (U of WI) Computer Science Department—1992.

U.S. Appl. No. 10/356,435, filed Jan. 31, 2003—Control-Quasi-Independent-Points Guided Speculative Multithreading / Marcuello et al.

U.S. Appl. No. 10/633,431, filed Jul. 31, 2003—Method and Apparatus for Affinity-Guided Speculative Helper Threads in Chip Multiprocessors / Wang et al.

* cited by examiner

MULTI-VERSION REGISTER FILE FOR MULTITHREADING PROCESSORS WITH LIVE-IN PRECOMPUTATION

BACKGROUND

1. Technical Field

The present disclosure relates generally to information processing systems and, more specifically, to a multi-version register file architecture for multithreading processing systems.

2. Background Art

In order to increase performance of information processing systems, such as those that include microprocessors, both hardware and software techniques have been employed. One approach that has been employed to improve processor performance is known as "multithreading." In multithreading, an instruction stream is split into multiple instruction streams that can be executed concurrently. In software-only multithreading approaches, such as time-multiplex multithreading or switch-on-event multithreading, the multiple instruction streams are alternatively executed on the same shared processor.

Increasingly, multithreading is supported in hardware. For instance, in one approach, referred to as simultaneous multithreading ("SMT"), a single physical processor is made to appear as multiple logical processors to operating systems and user programs. Each logical processor maintains a complete set of the architecture state, but nearly all other resources of the physical processor, such as caches, execution units, branch predictors, control logic, and buses are shared. In another approach, processors in a multi-processor system, such as a chip multiprocessor ("CMP") system, may each act on one of the multiple threads concurrently. In the SMT and CMP multithreading approaches, threads execute concurrently and make better use of shared resources than time-multiplex multithreading or switch-on-event multithreading.

For those systems, such as CMP and SMT multithreading systems, that provide hardware support for multiple threads, several independent threads may be executed concurrently. In addition, however, such systems may also be utilized to increase the throughput for single-threaded applications. That is, one or more thread contexts may be idle during execution of a single-threaded application. Utilizing otherwise idle thread contexts to speculatively parallelize the single-threaded application can increase speed of execution and throughput for the single-threaded application.

BRIEF DESCRIPTION OF THE DRAWINGS

The present invention may be understood with reference to the following drawings in which like elements are indicated by like numbers. These drawings are not intended to be limiting but are instead provided to illustrate selected embodiments of a multi-version register file architecture.

DETAILED DISCUSSION

Described herein are selected embodiments of a multi-version register file architecture and methods related thereto. In the following description, numerous specific details such as thread unit architectures (SMT and CMP), number of thread units, size of status fields, data organization schemes for various tables, and the like have been set forth to provide a more thorough understanding of the present invention. It will be appreciated, however, by one skilled in the art that the embodiments may be practiced without such specific details. Additionally, some well-known structures, circuits, and the like have not been shown in detail to avoid unnecessarily obscuring the embodiments discussed herein.

Figure 1:
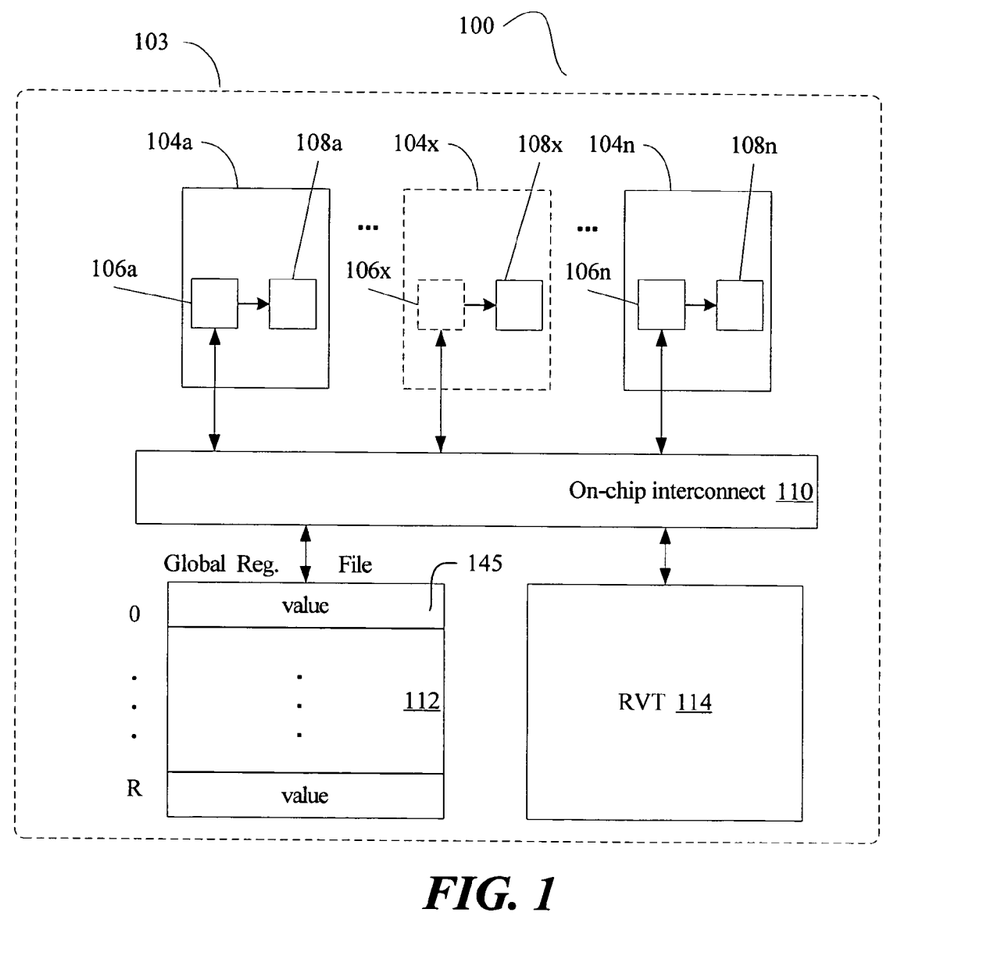
FIG. 1 is a block diagram of at least one embodiment of a multithreading processor that includes a multi-version register file architecture.

As used herein, the term "thread" is intended to refer to a set of one or more instructions. The instructions of a thread are executed in a thread context of a processor, such as processor 100 illustrated in FIG. 1. For purposes of the discussion herein, it is assumed that at least one embodiment of the processor 100 illustrated in FIG. 1 is equipped with hardware to support the spawning, validating, squashing and committing of speculative threads.

The multi-version register file embodiments discussed herein may thus be utilized in a processor that supports speculative multithreading. For at least one speculative multithreading approach, the execution time for a single-threaded application is reduced through the execution of one or more concurrent speculative threads. One approach for speculatively spawning threads to improve throughput for single-threaded code is discussed in commonly-assigned U.S. patent application Ser. No. 10,356,435 "Control-Quasi-Independent-Points Guided Speculative Multithreading." Under such approach, single-threaded code is partitioned into threads that may be executed concurrently.

For at least on embodiment, a portion of an application's code may be parallelized through the use of the concurrent speculative threads. A speculative thread, referred to as the spawnee thread, executes instructions that are ahead, in program order, of the code being executed by the thread that performed the spawn. The thread that performed the spawn is referred to as the spawner thread. For at least one embodiment, a CMP core separate from the core executing the spawner thread executes the spawnee thread. For at least one other embodiment, the spawnee thread is executed in a single-core simultaneous multithreading system that supports speculative multithreading. For such embodiment, the spawnee thread is executed by a second SMT logical processor on the same physical processor as the spawner thread. One skilled in the art will recognize that multi-version register file embodiments discussed herein may be utilized in any multithreading approach, including SMT, CMP multithreading or other multiprocessor multithreading, or any other known multithreading approach that may encounter idle thread contexts.

For at least one embodiment, the multi-version register file architecture discussed herein may be utilized for a speculative multithreading scheme that does not synchronize among a non-speculative spawner thread and one or more speculative threads. Instead, rather than synchronize to deal with data dependencies, a precomputation slice associated with each speculative thread is executed to speculatively compute live-in values (sometimes otherwise referred to herein as speculative thread input values). While live-in values could be predicted, for some embodiments, using a value prediction approach, for the embodiments discussed herein live-in values are pre-computed using speculative precomputation based on backward dependency analysis.

For at least one embodiment, the precomputation slice is executed before the main body of the speculative thread instructions, in order to pre-compute the live-in values for the speculative thread. The precomputation slice may be a subset of instructions from one or more previous threads. A "previous thread" may include the main non-speculative thread, as well as any other "earlier" (according to sequential program order) speculative thread.

Figure 9:
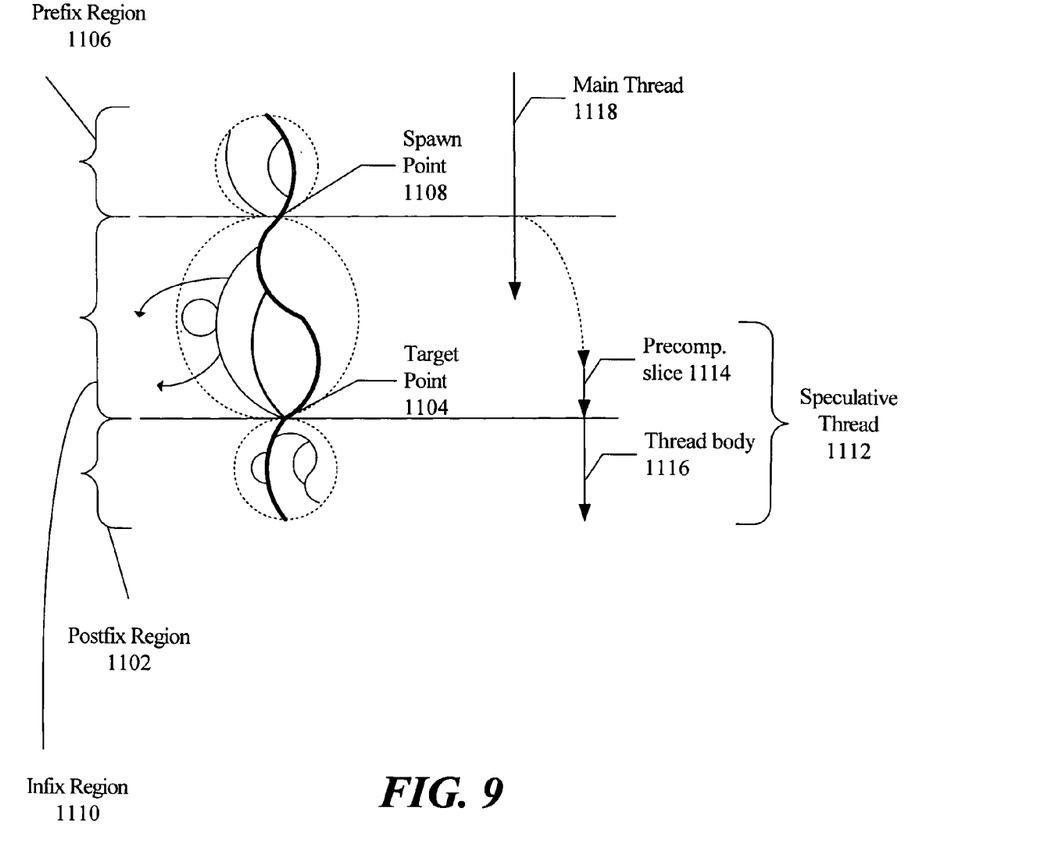
FIG. 9 is a diagram representing an illustrative main thread program fragment containing three distinct control-flow regions.

Brief reference is made to FIG. 9 for a further discussion of precomputation slices. FIG. 9 is a diagram representing an illustrative main thread 1118 program fragment containing three distinct control-flow regions. In the illustrated example, a postfix region 1102 following a target point 1104 can be identified as a program segment appropriate for execution by a speculative thread. A spawn point 1108 is the point in the main thread program at which the speculative thread 1112 will be spawned. The target point 1104 is the point at which the spawned thread will begin execution of the main thread instructions. For simplicity of explanation, a region 1106 before a spawn point 1108 is called the prefix region 1106, and a region 1110 between the spawn point 1108 and target point 1104 is called the infix region 1110.

A speculative thread 1112 may include two portions. Specifically, the speculative thread 1112 may include a precomputation slice 1114 and a thread body 1116. During execution of the precomputation slice 1114, the speculative thread 1112 determines one or more live-in values in the infix region 1110 before starting to execute the thread body 1116 in the postfix region 1102. The instructions executed by the speculative thread 1112 during execution of the precomputation slice 1114 correspond to a subset (referred to as a "backward slice") of instructions from the main thread in the infix region 1110 that fall between the spawn point 1108 and the target point 1104. This subset may include instructions to calculate data values upon which instructions in the postfix region 1102 depend. During execution of the thread body 1116, the speculative thread 1112 executes code from the postfix region 1102, which is an intact portion of the main thread's original code.

Turning now to FIG. 1, FIG. 1 illustrates at least one embodiment of a multithreaded processor 100. The processor 100 includes two or more thread units 104a-104n. For purposes of discussion, the number of thread units is referred to as "N." The optional nature of thread units 104 in excess of two such thread units is denoted by dotted lines and ellipses in FIG. 1. That is, FIG. 1 illustrates N≧2.

For at least one embodiment, the processor 100 employs a mechanism to identify, for each thread unit 104, whether the thread unit 104 is currently executing instructions from its precomputation slice 1114 or from the body 1116 of its thread instruction stream.

For at least one embodiment, each of the thread units 104 is a processor core, with the multiple cores 104a-104n residing in a single chip package 103. Each core 104 may be either a single-threaded or multi-threaded processor. For at least one alternative embodiment, the processor 100 is a single-core processor that supports concurrent multithreading. For such embodiment, each thread unit 104 is a logical processor having its own instruction sequencer, although the same processor core executes all thread instructions. For such embodiment, the logical processor maintains its own version of the architecture state, although execution resources of the single processor core are shared among all threads.

While the CMP embodiments of processor 100 discussed herein refer to only a single thread per processor core 104, it should not be assumed that the disclosures herein are limited to single-threaded processors. The techniques discussed herein may be employed in any CMP system, including those that include multiple multi-threaded processor cores in a single chip package 103.

FIG. 1 illustrates that each thread unit 104 may include a local register file 106. Each thread unit 104 may also include a register validation store 108 (see discussion of FIG. 2, below). One should note that, for at least some embodiments, the local register files 106-106n need not be separate structures. For example, for a single-core embodiment where each thread unit 104 is a logical processor, a single register file may be shared among the thread units 104a-104n. For such embodiment, the local register files 106a-106n may be implemented as a single file, with various portions of the single local register file being allocated to the separate thread units 104a-104n.

The local register files 106a-106n may communicate with each other via an interconnection network such as on-chip interconnect 110. Such interconnect 110 may allow register communication among the threads. In addition, FIG. 1 illustrates that each thread unit 104 may communicate with other components of the processor 100 via the interconnect 110. These other components may include a global register file 112 and a register versioning table ("RVT") 114.

The topology of the interconnect 110 may be a multi-drop bus, a point-to-point network that directly connects each pair of local register files 106 to each other, or the like. In other words, any interconnection approach may be utilized. For instance, one of skill in the art will recognize that, for at least one alternative embodiment, the interconnect 110 may be based on a ring topology.

According to an execution model that is assumed for at least one embodiment of processor 100, any speculative thread is permitted to spawn one or more other speculative threads. Because any thread can spawn a new thread, the threads can start in any order. The spawned threads are speculative in that they may be data and/or control dependent on previous threads.

Among the running threads, only one (referred to as the "main" thread) is non-speculative, for at least one embodiment. When all previous threads have either completed execution or been squashed, then the next speculative thread becomes the non-speculative main thread. Accordingly, over time the current non-speculative "main" thread may alternatively execute on different thread units.

Each thread becomes non-speculative and commits in a sequential order. Accordingly, there is a sequential order among the running threads. A speculative thread may be squashed if it violates sequential correctness of the single-threaded program.

The speculative threads can speed the execution of otherwise sequential software code. As each thread is executed on a thread unit 104, the thread unit 104 updates and/or or reads the values of architectural registers. Several of the components illustrated in FIG. 1 are therefore utilized to manage inter-thread data dependencies.

Distributed local register files 106 may maintain the architectural register state for each active thread. In addition, a global register file 112 includes a field 145 to store the committed architectural value for each of R architectural registers. For at least one embodiment, the global register file 112 is a centralized file that holds the committed register state at the point of the last non-speculative thread that has completed execution. (One should remember, of course, the speculative threads are assumed, for at least one embodiment, to complete execution and commit their architecture state in sequential program order). When the non-speculative thread finishes execution (that is, when it reaches the starting point at which the next speculative thread began execution), all registers written by the non-speculative thread (i.e., those with the updated bit set—see 206, FIG. 2) are copied to the GRF 112. In this manner, by updating the GRF 112 only for those registers that have been written by the non-speculative thread, less register traffic is generated when a thread finishes, in comparison with an approach that copies the entire local register file when the non-speculative thread completes normal execution.

The global register file 112 is accessed by a thread unit 104 when the thread unit 1) performs a read to a register not available in its local register file and 2) no less-speculative thread has written the register without committing it (the latter condition may be confirmed by examination of the RVT 114, which is discussed in further detail below).

FIG. 1 discloses a multi-version register file architecture that may be used to manage architectural register values in support of a speculative multithreading execution model. One goal of such architecture is to provide that, during the execution of a thread, any register read should return the previously-written (in sequential order) value of the register. The sequentially previously-written value of a register is also referred to herein as the "last" value for the register. For a register read, the last value for the indicated register may be obtained from the thread's own local register file 106, if the thread has previously written the register or the thread has previously copied the register value from another thread. Otherwise, the last value for the indicated register may be obtained from the closest active thread (in sequential order) that has produced a version of the register.

As is described in further detail below, the RVT 114 is a directory that maintains information that allows a thread to determine which active speculative thread has produced the last version of the desired architectural register. If no currently active thread has produced a non-committed version of the register, then the register value may be read from the global register file 112. Otherwise, the thread unit that has attempted to read the value from its local register (but found that the register is invalid), may request the most recent register value from the thread unit indicated in the RVT 114. Accordingly, a register transfer request may be sent to the identified thread unit in order to obtain the most recent register value for the requesting thread unit. The requesting thread unit may thus obtain the most recent register value for the architectural register. Subsequent reads to the same register will obtain the register value from the local register file of the requesting thread unit.

Figure 2:
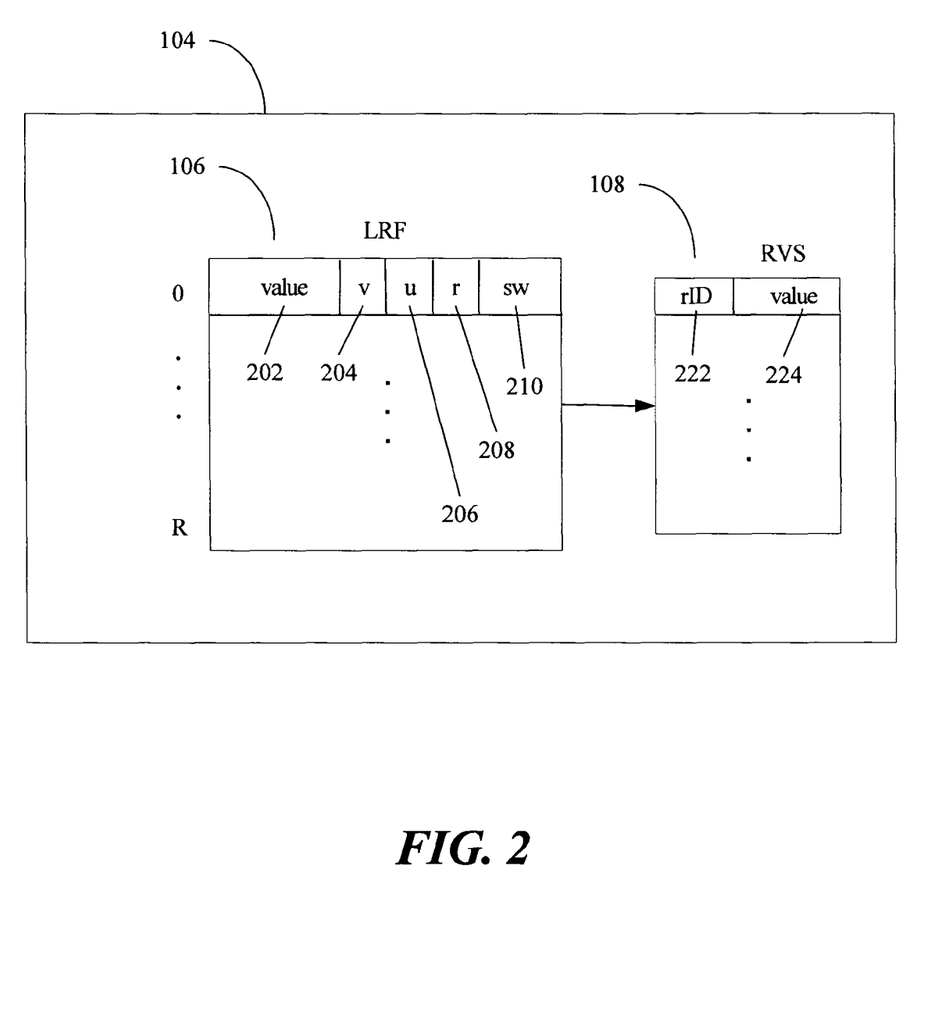
FIG. 2 is a block diagram illustrating further details of at least one embodiment of a thread unit.

FIG. 2 is a block diagram illustrating further details for at least one embodiment of a thread unit 104. The thread unit 104 may include a local register file 106 and a register validation store 108. Continuing with the nomenclature illustrated in FIG. 1, the embodiment of the thread unit 104 illustrated in FIG. 2 assumes R architectural registers. Because each of the thread units 104a-104n (see FIG. 1) includes a local register file 106, a processor (such as, for example, processor 100 of FIG. 1) may maintain multiple versions of each architectural register—one for each thread.

FIGS. 1 and 2 illustrate that the local register files 106 include a register value field 202, analogous to the register value field 145 of the global architectural register file 112. In addition, FIG. 2 illustrates that each entry of the local register file 106 includes, for at least one embodiment, several additional status fields. These fields may include one or more of a valid field 204, an updated field 206, a read field 208, and a slice write field 210. Each of these status fields 204, 206, 208, 210 is discussed in further detail immediately below. One of skill in the art will recognize that the status fields 204, 206, 208, 210 are not required to be any particular length. Those status fields 204, 206, 208, 210 whose contents are referred to as "bits", for convenience, in the following discussion need not necessarily be limited to one-bit values.

The contents of the valid field 204, such contents being sometimes referred to herein as the "valid bit," indicate whether the register entry is available in the local register file. If the valid bit in the valid field 204 indicates that the local register value for the entry is valid, then the contents of the value field 202 are available for use during execution of the thread that is currently under execution in the thread unit 104. Otherwise, if the valid bit indicates that the contents of the value field 202 are invalid, the value field 202 for that local register cannot be assumed to hold valid, meaningful data. For instance, the valid bit may indicate that the local register entry is valid once the value field 202 has been written (say, for example, during execution of the precomputation slice), or a value obtained from another thread unit has been stored in the value field 202. In contrast, the valid bit value in the valid field 202 may indicate that the register value data is invalid if the value field 202 has not been modified since spawning of the associated active thread.

The contents of the updated field 206, referred to herein as the "updated bit," indicate whether the local register file entry for the associated architectural register has been updated via execution of an instruction of the thread body for the thread associated with the thread unit 104. The updated bit may be set on the first write to the local register to indicate that the value field 202 for the register contains a new version of the register value that has been created by the thread itself.

The contents of the read field, 208, referred to herein as the "read bit," indicates whether the local register has been read before being written. A register entry of the local register file 106 that has the read bit set indicates that the contents of the value field 202 are an input value for the speculative thread (also referred to herein as a live-in value).

For at least one embodiment, the read bit is set in the read field 208 when the local register value 202 for the indicated register is read while the updated bit (see description above) is not set.

The contents of the slice write field, 210, referred to herein as the "slice write bit," indicates whether the local register value has been produced by the precomputation slice associated with the speculative thread. For at least one embodiment, the slice write bit may set on the first write to the local register during execution of the precomputation slice. When set, the slice write bit indicates that the local register value has been produced by the precomputation slice.

FIG. 2 further illustrates that the thread unit 104 also includes a validation buffer 108 referred to as a register validation store ("RVS"). For at least one embodiment, each entry of the validation buffer 108 may include a register identifier field 222 and a value field 224.

The RVS 108 buffer is to maintain register input values ("live-in values") consumed by a speculative thread. The buffer 108 is to support live-in register validation 712 discussed in connection with FIG. 7, below. In order to address inter-thread register dependencies, the validation 712 determines whether the speculative live-in values consumed by the speculative thread are correct.

Figure 3:
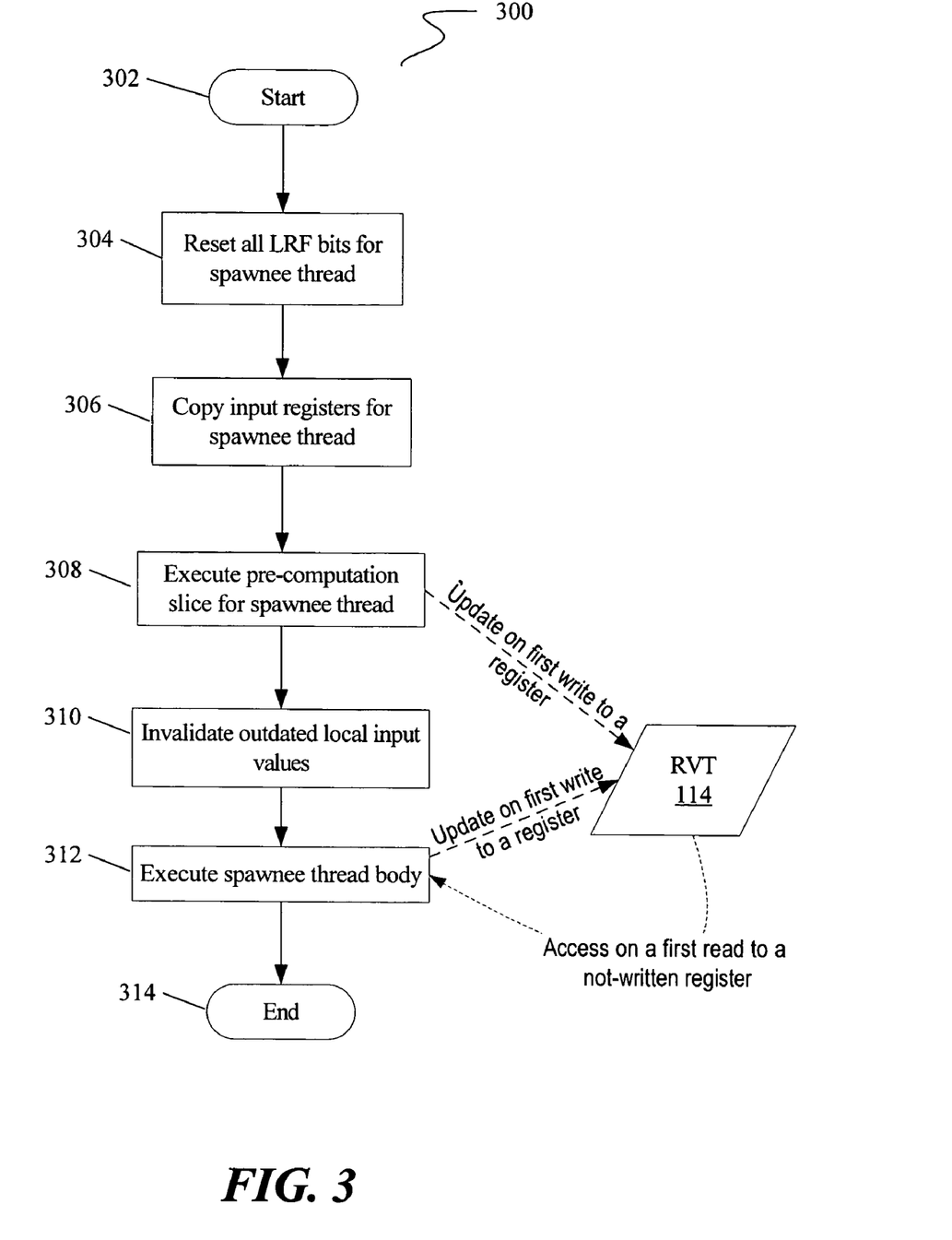
FIG. 3 is a flowchart illustrating at least one embodiment of a method for executing a speculative thread while taking into account data dependencies for non-synchronized speculative threads.

FIG. 3 is a flowchart illustrating at least one embodiment of a method 300 for executing a speculative thread for a system that includes a multi-version register file architecture. FIG. 3 is discussed herein with reference to FIGS. 1 and 2. For at least one embodiment, an otherwise idle thread unit, such as a thread unit 104 illustrated in FIGS. 1 and 2, may perform the method 300 of FIG. 3.

FIG. 3 illustrates that processing for the method 300 begins at block 302 and proceeds to block 304. At block 304, for at least one embodiment, each of the status fields 204, 206, 208, 210 are cleared by the thread unit 104 when a new speculative thread is spawned. Accordingly, at such time no local register values are available to the speculative thread. Processing then proceeds to block 306.

The reading of a register, during execution 308 of the precomputation slice, should return the value generated by the precomputation slice, if the register previously has been written during execution of the precomputation slice. Otherwise, the register read should return the value of the register from the spawner thread immediately before the new thread was spawned. Accordingly, after a thread is spawned, but before the pre-computation slice is executed, certain register values may be copied 306 from the spawner thread architecture state to the spawnee thread's local register file 106. For at least one embodiment, a spawning instruction therefore includes (either in the spawn instruction itself or in one or more following instructions) the identifiers of the subset of registers that are to be copied as live-ins for the precomputation slice. For these register values that have been copied from the spawner thread, the valid bit is set to "true", but the updated bit and sw bit remain reset. Processing then proceeds to block 308.

At block 308, the precomputation slice for the spawnee thread is executed. During execution 308 of the precomputation slice, certain registers may be written to generate live-in values to be consumed by the thread body. On each such write, the sw status field 210 and the v status field 204 are set for the local register that has been written. As is illustrated in FIG. 3, register writes during execution 308 of the precomputation slice cause an update to the register versioning table 114.

After the precomputation slice has completed execution, the thread unit may modify 310 entries in the local register file 106. For example, any register value that was copied from the spawner thread, but not utilized by the precomputation slice, may be marked as invalid at block 310. Such invalidation may be undertaken due to the understanding that the value is potentially outdated—any thread less speculative than the one that has just executed the precomputation slice may have created a new version of the register value in the meantime. For at least one embodiment, such invalidation 310 is performed by setting the valid bit for the register's local register file 106 entry to a "false" value if the register entry's slice write bit is not set.

After invalidating the outdated live-in values at block 310, processing proceeds to block 312. At block 312, the thread body of the thread is executed. If, during such execution 312, the thread body attempts to read a register that has not previously been written by the thread itself, the following processing may be performed. If the register is not valid (v bit unset) the register versioning table (see, for example, 114, FIG. 1) is accessed to find from which other thread unit the desired register value should be requested. In such case, the register value is obtained from other thread unit and the "valid" bit and the "read" bit are set in the local register file 106 (See FIGS. 1 and 2).

If, however, a valid value exists in the local register file 106 (see FIGS. 1 and 2), then the method 300 may determine at block 312 whether a register value from the local register file 106 is read by the new thread before it has been written. If so, the method 300 also sets, at block 312, the "read" bit to indicate that such value was read before it was written.

If, at block 312, the thread unit 104 reads a register with both the read bit and updated bit not set, an entry is entered into the thread unit's register validation store 108 (see FIGS. 1 and 2). Such processing is described in further detail below. Generally, such processing provides for later validation of live-in values consumed by the speculative spawnee thread. After the thread body has completed execution (either by reaching the end of its instruction stream, or by being squashed), processing ends at block 314.

Figure 4:
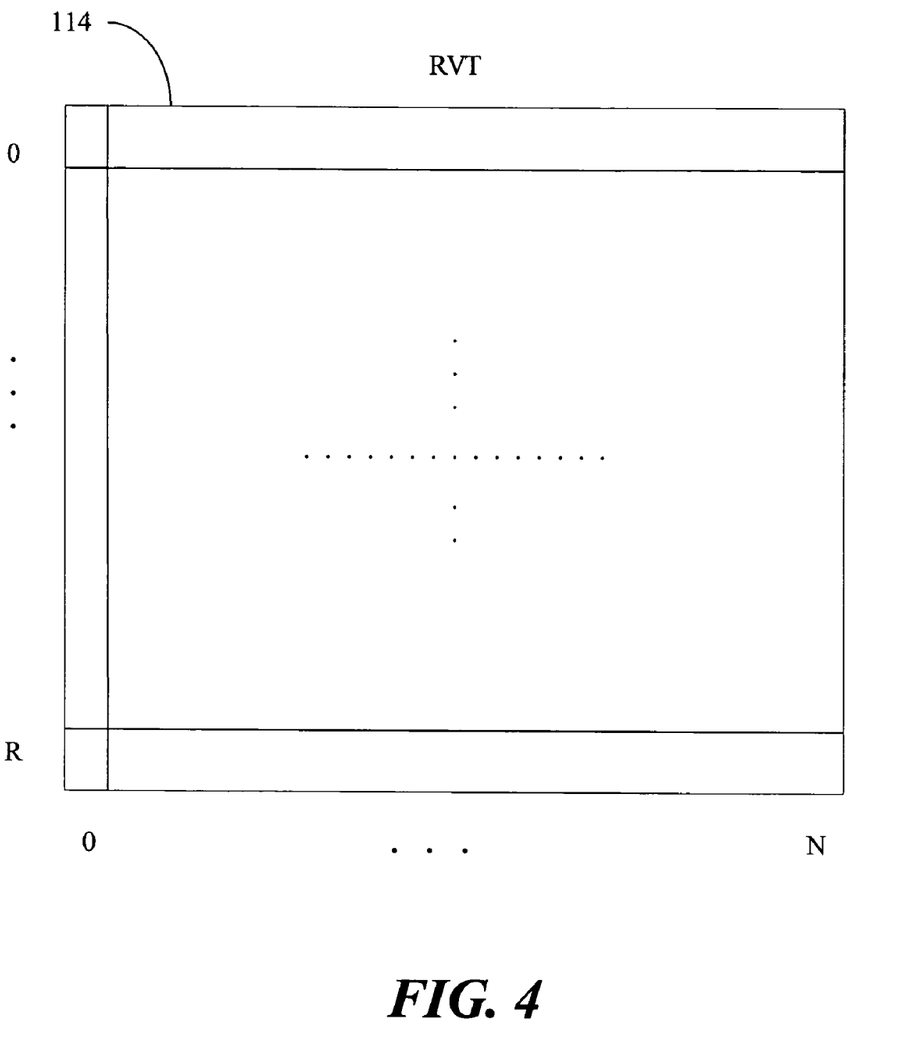
FIG. 4 is block diagram illustrating at least one embodiment of a register versioning table.

FIG. 4 is a block diagram illustrating further details for at least one embodiment of a register versioning table 114. Continuing with the nomenclature illustrated in FIGS. 1 and 2, the register versioning table 114 embodiment illustrated in FIG. 4 assumes N thread units 104 and R architectural registers.

For at least one embodiment, the register versioning table 114 acts as a centralized table that tracks the available register versions among the different thread units. For a processor having N thread units 104a-104n, the register versioning table may include N columns, with each column representing the register state for one thread unit 104. Each column may include R rows, such that each column includes a row for each of the R architectural registers. Accordingly, for at least one embodiment the register versioning table 114 is organized as a table of N×R bits, with each column representing at thread unit and each row representing an architectural register. For at least one embodiment, then, the register versioning table 114 may be conceptualized as a directory that indicates, for each architectural register, which of the thread units 104a-104n have generated a version of the architectural register's value.

The information maintained in the register versioning table 114 may be utilized, in light of the sequential program order for each of the active threads, to determine the most accurate version of the architectural register value, among the thread units 104a-104n, for any given point in time. Such information can be useful, for instance, when a running thread attempts to read a register value that is indicated, in its local register file, as invalid. In such case, the first thread unit may request, via the interconnect 110 illustrated in FIG. 1, a value from the local register file of another thread unit. The first thread unit may utilize information maintained in the register versioning table 114 to determine which remote thread unit has produced the most recent available version of the register value. Accordingly, the first thread unit may request the desired register value from the indicated remote thread unit.

Alternatively, the desired register value may be retrieved from the global register file (see, for example, 112, FIG. 1).

Figure 5:
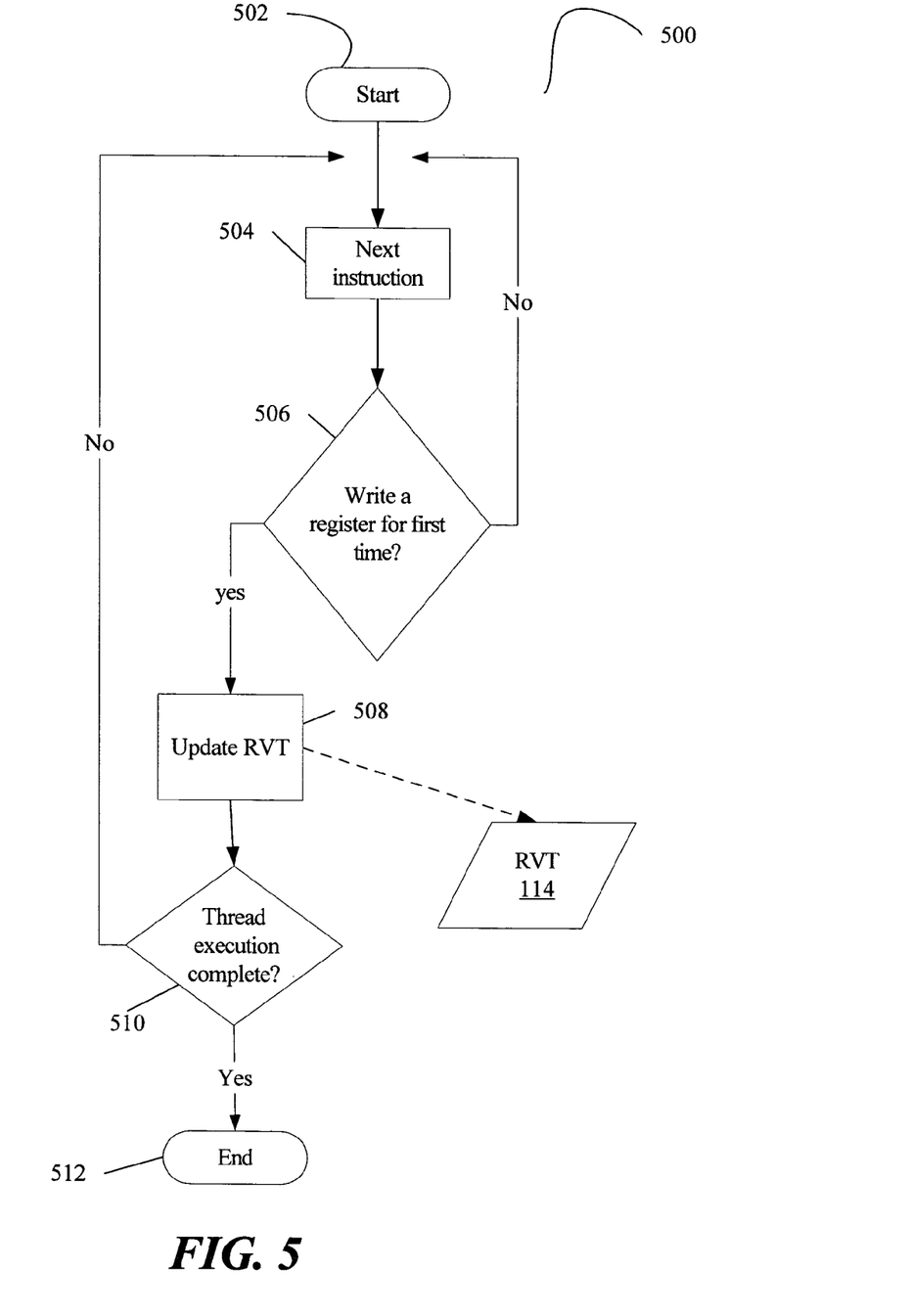
FIG. 5 is a flowchart illustrating at least one embodiment of a method for tracking register values among multiple threads.

FIG. 5 is a flowchart illustrating at least one embodiment of a method 500 for maintaining the register versioning table ("RVT") 114 for register writes during execution of the thread. The method 500 may be performed, for at least one embodiment, by a thread unit such as thread units 104a-104n illustrated in FIG. 1. The method may performed, for instance, during execution of the precomputation slice (see block 308, FIG. 3) and/or during execution of the thread body (see block 312, FIG. 3).

The method begins at block 502 and proceeds to block 504. At block 504, the instruction pointer is incremented to the next thread instruction. Processing then proceeds to block 506, where the instruction is executed. If the instruction is a write instruction, it is determined if the write instruction writes a register that does not reflect, in the local register file (see 106, FIG. 2) that it has previously been written by the current thread. For instance, if a register is written during execution of the precomputation slice (see 308, FIG. 3) and the register's sw bit is not set, then the check at block 506 evaluates to "true." Similarly, if a register is written during execution of the thread body (see block 312, FIG. 3) and neither its updated bit nor its sw bit is set, the check at block 506 evaluates to "true" as well. In either case, during execution 506 of the instruction, the v bit is set, and processing proceeds to block 508. In such cases the thread has not previously written the register. Because it is now being written for the first time, an entry for the register is created, for this thread, in the register versioning table 114 at block 508.

Processing then loops back to block 504 to process the next instruction. Such loop-back processing includes a check at block 510 to determine whether the thread has completed execution of its instructions. If not, processing loops back to block 504. Otherwise, if processing has been completed for the thread, processing may end at block 512. (As is discussed below in connection with FIG. 6, additional thread termination processing may be performed before the method 500 ends at block 512).

If it is determined at block 506 that the next thread instruction does not involve a write to a register that has not previously been written by the current thread, then an update of the RVT 114 need not, for at least one embodiment, be performed. In such case, processing may loop back to block 504.

Figure 5A:
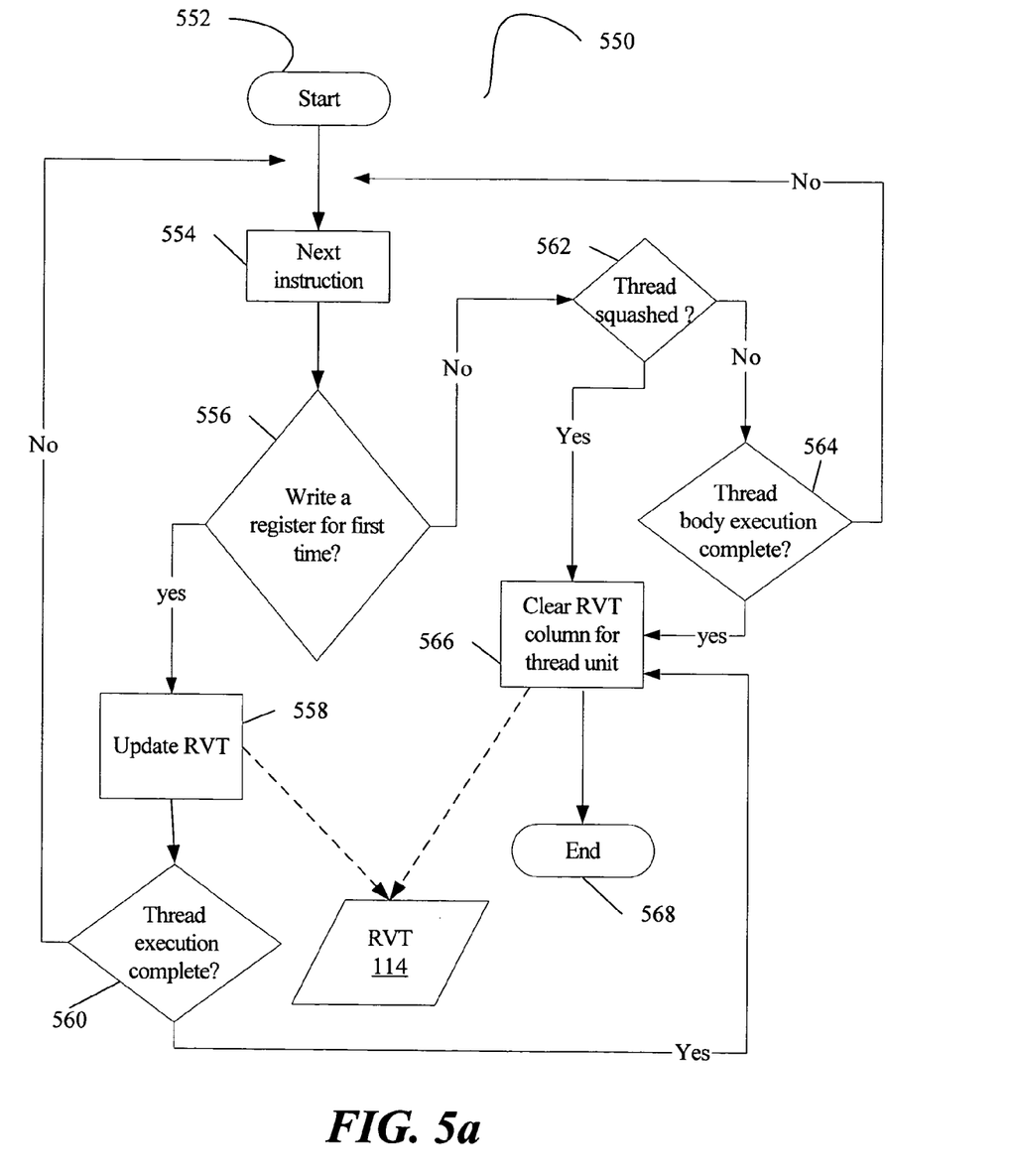
FIG. 5a is a flowchart illustrating at least one embodiment of additional details for a method for tracking register values among multiple threads.

FIG. 5a illustrates additional processing that may be performed for a method of updating a register versioning table for register writes. The embodiment of the method illustrated in FIG. 5a is referred to as method 550. The method 550 may be performed, for at least one embodiment, by a thread unit such as thread units 104a-104n illustrated in FIG. 1.

The method begins at block 552 and proceeds to block 554. At block 554, the instruction pointer is incremented to the next thread instruction. Processing then proceeds to block 556, where the instruction is executed. During such execution 556, the valid bit is set for the register value that is written. As is discussed above in connection with block 506 of FIG. 5, if the instruction is a write instruction, it is determined at block 556 whether the write instruction writes a register that does not reflect, in the local register file (see 106, FIG. 2) that it has previously been written by the current thread. If so, then because it is now being written for the first time, an entry for the register is created at block 558, for this thread, in the register versioning table 114.

From block 558, processing proceeds to block 560. At block 560 it is determined whether the thread has completed execution of its instructions. If not, processing loops back to block 554. Otherwise, if processing has been completed for the thread, processing proceeds to block 566.

If it is determined at block 556 that the current instruction does not write a register for the first time in the current thread, then processing proceeds to block 562. At block 562, it is determined whether the current thread has been squashed. If so, processing proceeds to block 566. Otherwise, processing proceeds to block 564.

At block 564, it is determined whether the thread has completed execution. If not, processing proceeds to block 554 in order to execute the next thread instruction. If the thread has completed execution of the instructions in its instruction stream, then processing proceeds to block 566.

One of skill in the art will recognize that the thread squash determination illustrated at block 562 and the check for normal execution termination 564 reflect an active "poll"-type approach. However, for other embodiments, the squashing of a thread and/or the normal termination of a thread may generate an event, such as an exception. In such cases, the squash status may be detected passively. For such approach, the clearing action 566 is performed, albeit in response to an asynchronous event rather than in response to a synchronous poll action.

At block 566, the column of the RVT 114 that corresponds to the thread unit that was running the terminated thread is cleared when the thread unit is freed. Due to this re-initialization action 566, the RVT 114 will no longer reflect that the squashed thread has written any register values that are available to other threads. Processing then ends at block 568.

Figure 6:
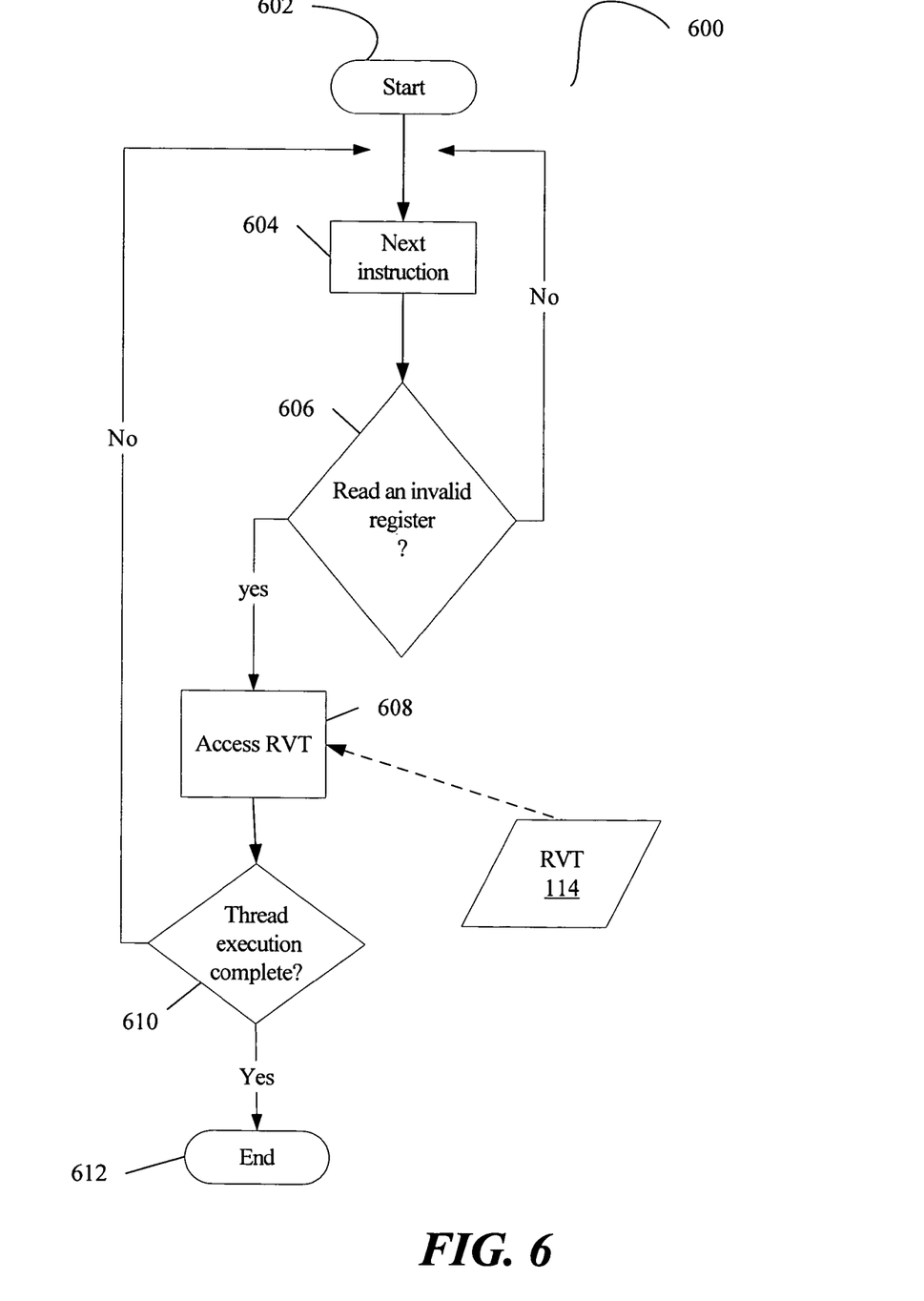
FIG. 6 is a flowchart illustrating at least one embodiment of a method for determining which of a plurality of thread units has written a most recent version of an architectural register.

FIG. 6 illustrates at least one embodiment of a method 600 for utilizing, during register reads, a register versioning table 114 to determine which thread unit, if any, has the most recent value for a register in its local register file (see 106, FIGS. 1 and 2). For at least one embodiment, the method 600 may be performed by a thread unit such as thread units 104a-104n illustrated in FIG. 1 and assumes that the RVT 114 has been modified as described above in connection with FIGS. 5 and 5a.

FIG. 6 illustrates that the method 600 begins at block 602 and proceeds to block 604. At block 604, the instruction pointer is incremented to the next thread instruction. Processing then proceeds to block 606, where the instruction is executed. During such execution 606, it is determined whether the instruction executes a read of an invalid register. If so, processing proceeds to block 608. Otherwise, processing loops back to block 604 in order to process the next thread instruction.

At block 608, the thread unit accesses the RVT 114 in order to determine which active speculative thread has produced the last version of the desired architectural register. If no currently active thread has produced a non-committed version of the register, then it is so determined at block 608 and the register value may be read from the global register file 112. Otherwise, the thread unit that has attempted to read the value from its local register (but found that the register is invalid), requests, at block 608, the most recent register value from the thread unit indicated in the RVT 114. Accordingly, a register transfer request may be sent to the identified thread unit in order to obtain the most recent register value for the requesting thread unit. The requesting thread unit may thus obtain the most recent register value for the architectural register. Processing then proceeds to block 610.

At block 610, it is determined whether the thread has completed execution of its instructions. If not, processing loops back to block 604. Otherwise, if processing has been completed for the thread, processing ends at block 612.

Figure 7:
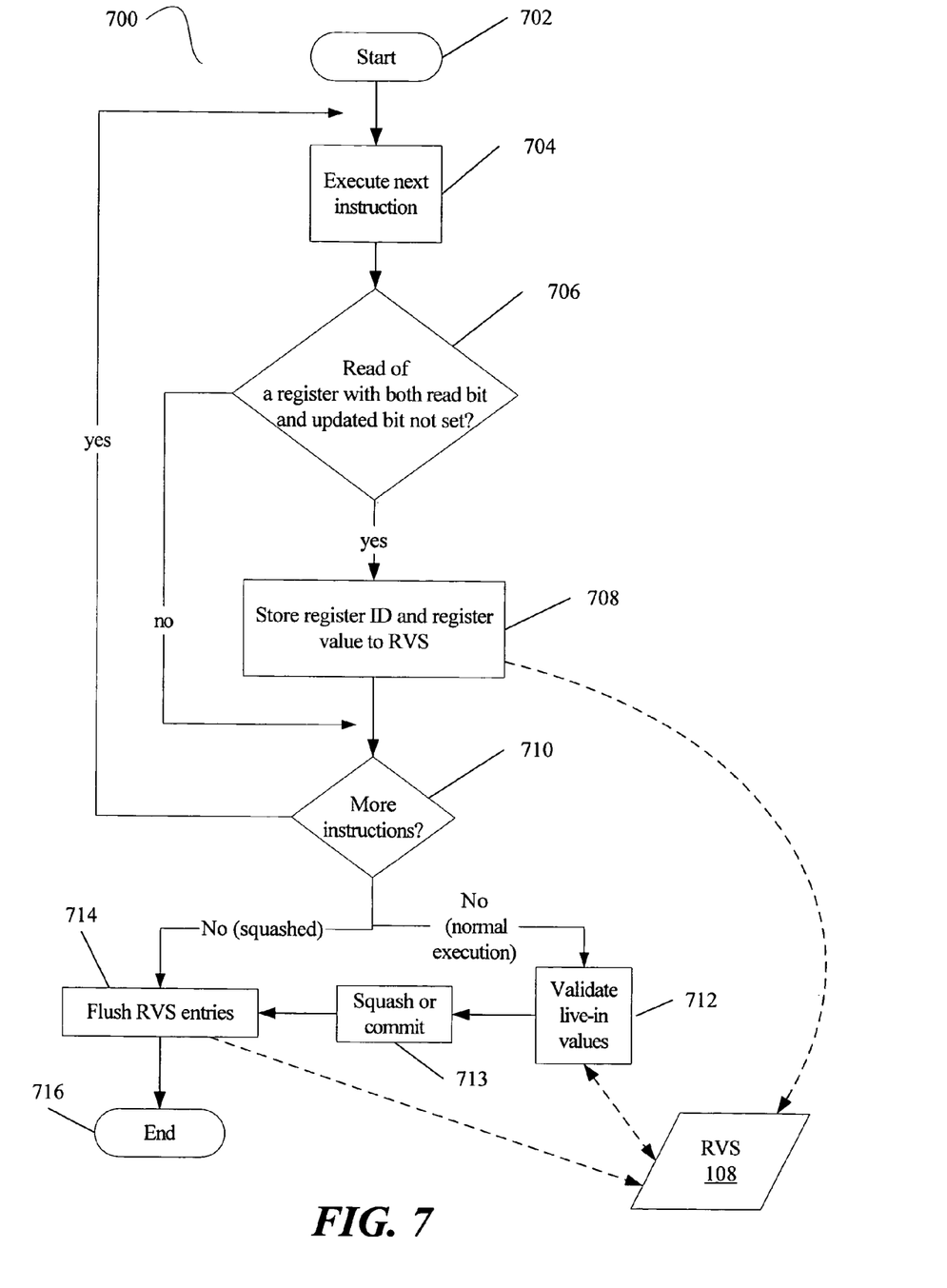
FIG. 7 is a flowchart illustrating at least one embodiment of a method for validating speculative live-in register values.

FIG. 7 illustrates a method 700 for utilizing a validation buffer, such as RVS 108, to validate live-in values. The method 700 may be performed by a thread unit such as, for example, thread unit 104 illustrated in FIGS. 1 and 2, to validate the register input values consumed by a speculative thread.

FIG. 7 illustrates that the method begins at block 702. An instruction of the thread body is executed at block 704. For each instruction that is executed, it is determined at block 706 whether the current instruction being executed by the thread unit involves a read of a register that has both the read bit and the updated bit not set. In such case, the register value is being read for the first time during execution of the thread body (see 1116, FIG. 9) and the register value has not previously been written by the thread body. In other words, the register value that is being read is a live-in value. If the determination at block 706 evaluates to "false," processing proceeds to block 710.

If the determination at block 706 evaluates to "true," then processing proceeds to block 708. At block 708, the register identifier for the register that was read at block 706 is forwarded to the RVS 108. In addition, the actual register value contents are also forwarded to the RVS 108. The register ID is to be stored in the rID field of an RVS entry (see 222, FIG. 2) and the register value is to be stored in the value field of an RVS entry (see 224, FIG. 2). Processing then proceeds to block 710.

At block 710 it is determined whether additional instructions are to be executed by the thread unit. If so, processing loops back to block 704.

If no additional instructions are to be executed by the thread unit, then the thread has terminated in one of two manners. For normal termination, wherein a thread has completed execution of its instruction stream, processing proceeds to block 712. At block 712, the thread register live-in values that have been stored in the RVS 108 are validated when a thread completes execution. For at least one embodiment, thread register live-in values may be values that have been read from another thread or have been generated by the current speculative thread's precomputation slice.

Regarding validation 712, the contents of live-in registers consumed by the thread may be performed, for at least one embodiment, in the following manner. Generally, when the non-speculative thread finishes execution (that is, when it reaches the starting point at which the next speculative thread began execution), and before the next speculative thread becomes the new non-speculative thread, the method 700 determines 712 whether the thread's register live-ins have been correctly precomputed and that all the register inter-thread dependences are met.

Specifically, for each value stored in the register validation store buffer 108, the thread unit 104 determines whether that value matches the register value, for the same register, that is present in the local register file of the non-speculative thread. In the case that the register is marked as not valid in the local register file of the non-speculative thread, the value of the register for the spawning thread may be determined by examining the global register file 112. If the value consumed by the spawnee thread (such values being reflected in the RVS 108) match the values for the non-speculative thread, then the speculative thread has indeed utilized values that were, in fact, those values that it would have consumed during non-speculative execution of the instruction stream. Accordingly, if such values match, then the live-ins are considered valid, and the thread may become the new non-speculative thread. Otherwise, the live-in values are not considered valid, and the spawnee thread should be squashed.

Processing then proceeds to block 713. At block 713, the thread is squashed if its register values have not been validated at block 712. Also, if the thread has become non-speculative (i.e., its live-in register values have been validated at block 712), its register values area committed at block 713 to the global register file 112 when it finishes execution. Processing then proceeds to block 714, where the contents of the RVS 108 are flushed. Also at block 714, the column of the RVT 114 that corresponds to the thread unit 104 is flushed, since the next thread to be executed on the thread unit 104 should begin with an empty local register file 104. Processing then ends at block 716.

However, the thread may have been squashed before it completed execution normally. In such case, processing proceeds directly to block 714 from block 710. The contents of the RVS 108 are flushed at block 714. Processing then ends at block 716.

In the foregoing manner, the method 700 provides that the RVS 108 buffers thread register live-in values that have been either read from another thread or from a local register whose value was generated by the precomputation slice. These live-in values are buffered in order to be available for later validation. (See block 312).

For purposes of explanation, specific numbers, examples, systems and configurations were set forth in the foregoing description in order to provide a more thorough understanding. However, it is apparent to one skilled in the art that the described method may be practiced without the specific details. In other instances, well-known features were omitted or simplified in order not to obscure the method.

Embodiments of the method may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the method described herein is not limited in scope to any particular programming language. In any case, the language may be a compiled or interpreted language The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system. The instructions, accessible to a processor in a processing system, provide for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Figure 8:
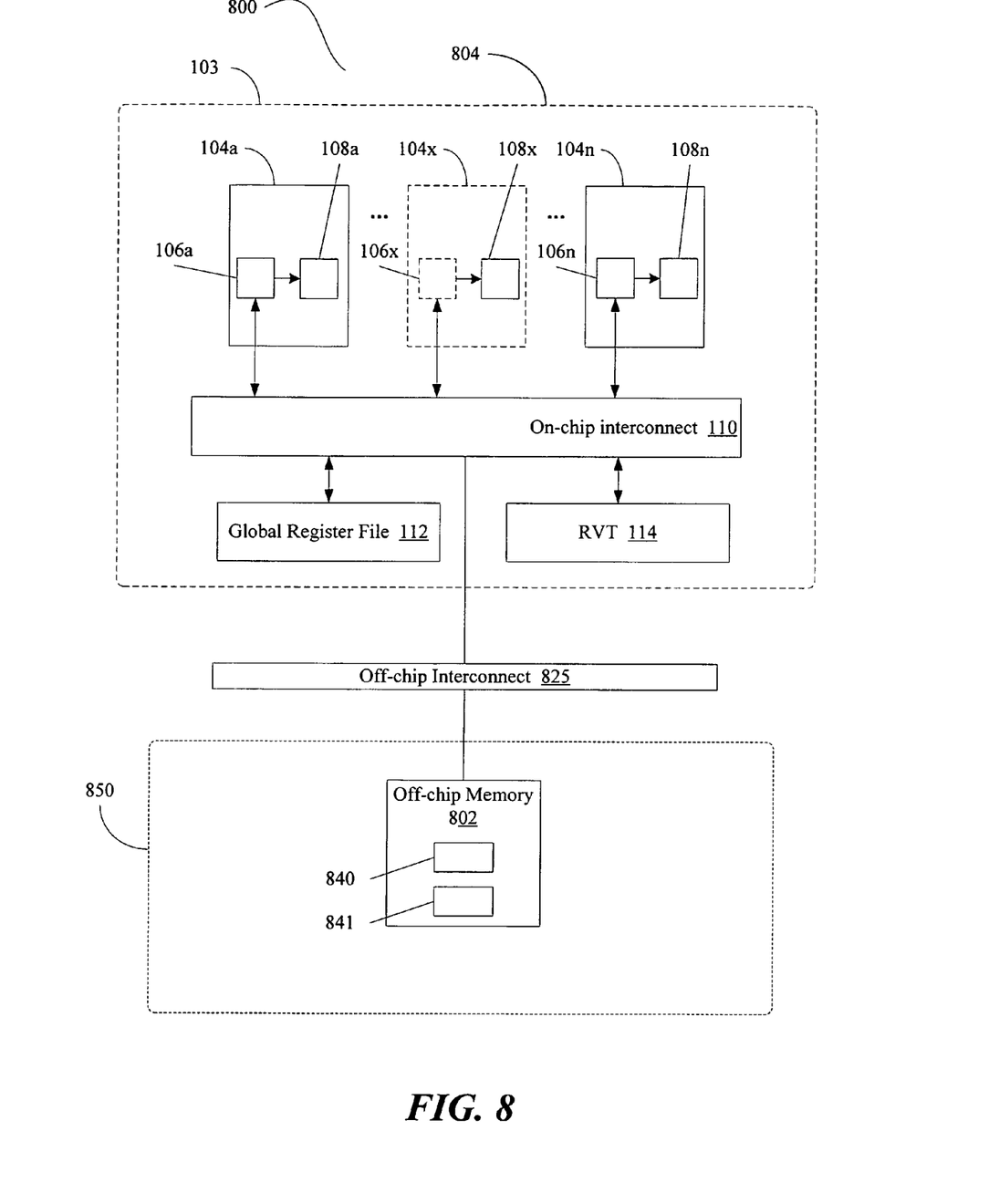
FIG. 8 is a block diagram of at least one embodiment of a processing system having a processor that employs an embodiment of a multi-version register file architecture.

An example of one such type of processing system is shown in FIG. 8. System 800 may be employed, for example, to perform embodiments of speculative multithreading that does not synchronize threads in order to correctly handle data dependencies. System 800 may provide embodiments of mechanisms to manage architectural registers during such embodiments of speculative multithreading. System 800 is representative of processing systems based on the Pentium®, Pentium® Pro, Pentium® II, Pentium® III, Pentium® 4, and Itanium® and Itanium® II microprocessors available from Intel Corporation, although other systems (including personal computers (PCs) having other microprocessors, engineering workstations, set-top boxes and the like) may also be used. In one embodiment, sample system 800 may be executing a version of the Windows™ operating system available from Microsoft Corporation, although other operating systems and graphical user interfaces, for example, may also be used.

FIG. 8 illustrates that processing system 800 includes a memory system 850 and a processor 804. The processor 804 may be, for one embodiment, a processor 100 as described in connection with FIG. 1, above. Like elements for the processors 100, 804 in FIGS. 1 and 8, respectively, bear like reference numerals.

Processor 804 includes N thread units 104a-104n, where each thread unit 104 may be (but is not required to be) associated with a separate core. For purposes of this disclosure, N may be any integer >1, including 2, 4 and 8. For at least one embodiment, the processor cores 104a-104n may share the memory system 850. The memory system 850 may include an off-chip memory 802 as well as a memory controller function provided by an off-chip interconnect 825. In addition, the memory system may include one or more on-chip caches (not shown).

Memory 802 may store instructions 840 and data 841 for controlling the operation of the processor 804. Memory 802 is intended as a generalized representation of memory and may include a variety of forms of memory, such as a hard drive, CD-ROM, random access memory (RAM), dynamic random access memory (DRAM), static random access memory (SRAM) and related circuitry. Memory 802 may store instructions 840 and/or data 841 represented by data signals that may be executed by processor 804. The instructions 840 and/or data 841 may include code for performing any or all of the techniques discussed herein.

While particular embodiments of the present invention have been shown and described, it will be obvious to those skilled in the art that changes and modifications can be made without departing from the present invention in its broader aspects. The appended claims are to encompass within their scope all such changes and modifications that fall within the true scope of the present invention.

What is claimed is:

1. A system, comprising:
   a memory subsystem coupled to a processor;
   the processor having N thread units to support speculative multithreading; and
   a register versioning table coupled to the thread units, the register versioning table having N×R entries, the register versioning table to indicate, for each of the N thread units, whether the thread unit has written a value for each of R architectural registers;
   wherein each thread unit includes a validation buffer to store speculatively precomputed live-in values;
   wherein each thread unit further includes a local register file for the R architectural registers, wherein each thread unit determines whether the precomputed live-in values match local register file values, if such values match, the precomputed live-in values are marked valid; and
   a global register file to hold the committed state for each of the R architectural registers, wherein the global register file is accessed by a thread unit when the thread unit performs a read to a register not available in its local register file and no less-speculative thread has written the register without committing it.

2. The system of claim 1, wherein: the processor is a chip multiprocessor having a plurality of processing cores in a single chip package.

3. The system of claim 2, wherein: each of the thread units is associated with a different of one of said processing cores.

4. The system of claim 1, wherein: the processor is a simultaneous multithreading processor having a plurality of logical processors.

5. The system of claim 4, wherein: each of the thread units is associated with a different of one of said logical processors.

6. The system of claim 1, wherein: the memory subsystem includes a DRAM memory.

7. The system of claim 1, wherein: the global register file is accessible to each of the thread units.

* * * * *